June 10, 1952  R. F. MINER  2,600,314
BAIT HOLDER
Filed Aug. 26, 1949

INVENTOR.
Raymond F. Miner
BY
Ohmung & Ohmung
Attys.

Patented June 10, 1952

2,600,314

UNITED STATES PATENT OFFICE 2,600,314

BAIT HOLDER

Raymond F. Miner, West Branch, Iowa

Application August 26, 1949, Serial No. 112,609

3 Claims. (Cl. 43—41)

This invention relates generally to fish lures and more particularly to a combination bait holder and weed guard.

A great amount of fishing, both sport and commercial, is done with the use of food for bait. For example, edible cat fish are caught in the Mississippi River and its tributaries with cheese or blood meat for bait, and in many localities it is common practice for fishermen to bait their hooks with small meat balls, pieces of bread, etc. Great difficulty is encountered in securing this food bait to the hook as it tends to disintegrate or become unhooked. Another difficulty is that fish hooks frequently become snagged on underwater obstructions such as logs and roots, and also become entangled in sea weeds.

To overcome these various difficulties I have invented a combination bait holder and weed guard which is in the form of an inverted bell shaped cup made of rubber or other resilient material. This cup, which is for use with a standard type multiple hook, is so designed that when assembled with the hook it provides a natural cup-like container within which to place the bait while at the same time guarding the ends of the hooks from contact with weeds and snagging obstructions.

My invention has for one of its objects to provide a bait holding and dispensing device for use with fish hooks.

Another object is to provide an adequate weed guard for fish hooks.

Another object is to provide a combination weed guard and bait holder which is easily and quickly applied to or removed from a standard fish hook.

Another object is to provide a combination weed guard and bait holder which is efficient, durable, and inexpensive.

Other objects and advantages will become apparent from a consideration of the following detailed description taken in connection with the accompanying drawings wherein a suggestive embodiment of the invention is shown. However, it will be understood that the invention is not limited to the details disclosed but includes all such variations and modifications as fall within the spirit of the invention and the scope of the appended claims.

Figure 2:
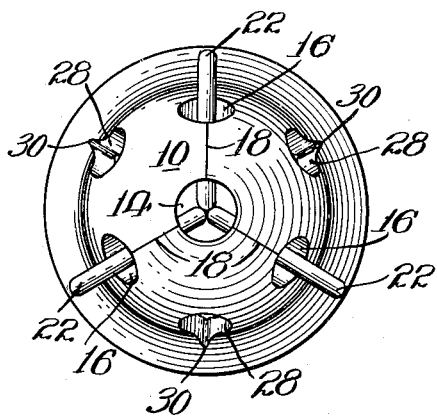
Fig. 2 is a bottom plan view thereof.
Figure 3:
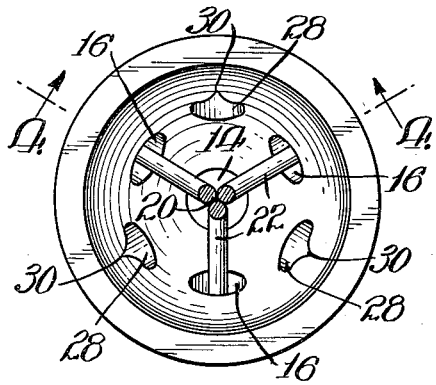
Fig. 3 is a top plan view thereof.

As shown, my invention comprises a cup made of rubber or other resilient material, much in the form of an inverted bell having a rounded bottom 10 and outwardly inclined sides 12. There is a round hole 14 in the center of the bottom and three like holes 16 located in the upper region of the rounded bottom equidistantly from its center hole 14 and from each other. A through slit 18 extends between each of the holes 16 and the bottom hole 14, as shown in Fig. 2.

Figure 1:
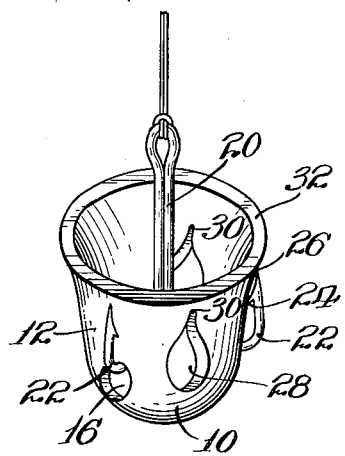
Figure 1 is a perspective view looking down from above upon my cup attachment assembled with a standard type treble hook.
Figure 4:
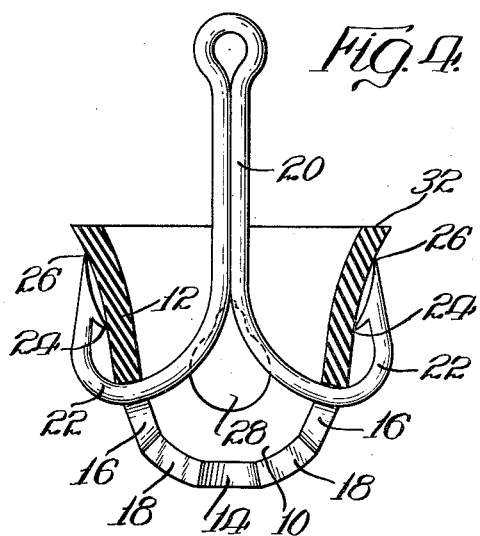
Fig. 4 is a vertical sectional view, taken on line of Fig. 3.

In assembling the cup with a treble hook of the type illustrated in the drawings, the shank 20 common to the hooks 22 is inserted through the bottom hole 14 and moved upwardly until the hooks 22 touch the bottom 10, then by pulling the hooks 22 through the slits 18 each one finally comes to rest against the upper edge of one of the holes 16 with the barb 24 lightly touching and substantially parallel to the outside surface of the cup side 12 (Figs. 1 and 4). Thus, when in assembled relation, the individual hooks 22 protrude outwardly from the holes 16 with their pointed ends 26 outside of the cup side 12 and their common shank 20 protruding upwardly from within the cup.

Three openings 28 narrowing to a point at the top 30 are spaced slightly above and equidistant from the holes 16. These openings which may be of a generally pear-shape configuration have a twofold purpose. In common with the holes 14 and 16 already mentioned, the pear-shaped openings 28 function as food dispensers in that they permit the escape of bait in small quantities which, in turn, serves to attract fish and lure them to the bait in the cup. These pear-shaped openings 28 also have a structural function in that by reducing the amount of material in the wall 12 they lessen its stiffness and, conversely, increase the compressibility of the cup sides 12 in the area of the hook ends 26. The peculiar shape of these openings 28, viz. the narrowing to a point at the top 30, serves to progressively increase the stiffness of the cup sides 12 toward its rim 32. It has been found that if this rim is too resilient or easily compressed, then it fails to function properly in fending off weeds and other obstructions and preventing them from becoming entangled with the hooks 22. On the other hand, if the sides 12 be too rigid the fish when biting the cup may not compress it sufficiently to expose the hook ends 26 and barbs 24, and consequently do not get caught thereon.

I claim:
1. For use with a fish hook comprising a shank portion having three upwardly pointed hooks, a bait containing cup having outwardly inclined sides, a rounded bottom, and an open top, said cap being formed of a resilient material, the cup bottom having a central hole therethrough for receiving the shank of the fish hook, the cup sides having three holes equidistant from the bottom hole and from each other each adapted to receive one of the hooks and being provided with slits, one extending from said bottom hole outwardly to each of said holes and arranged to allow frictional passage therethrough of one of the hooks, all of the hooks being disposed closely adjacent the resilient cup sides wherein are formed three upstanding pear-shaped openings spaced equidistantly from each other and from the three holes first named for releasing food from within the cup to the outside thereof at points adjacent the hooks.

2. For use with a fish hook comprising a shank portion having a plurality of upwardly pointed hooks, an open top resilient bait containing cup having a bottom with sides joined thereto, the cup bottom being formed therethrough with a hole adapted to slidingly receive the fish hook shank, the cup sides being formed with holes connected by slits to the bottom hole and each being arranged to allow one of the hooks, when protruding outwardly through the bottom hole, to pass therefrom lengthwise through the slits and into the side holes so as to protrude outwardly therefrom and upwardly into positions closely adjacent the resilient cup sides at points near the open top of the cup.

3. For use with a fish hook comprising a shank portion having a plurality of upwardly pointed hooks, an open top resilient bait containing cup having a bottom with sides joined thereto, the cup bottom being formed with a hole therethrough adapted to slidingly receive the fish hook shank, the cup sides being formed with holes connected by slits to the bottom hole and each being arranged to allow one of the hooks, when protruding outwardly through the bottom hole, to pass therefrom lengthwise through the slits and into the side holes so as to protrude outwardly therefrom and upwardly into positions closely adjacent the resilient cup sides near the open top of the cup, the cup sides being provided also with other openings each adjacent one of the cup side holes for releasing food from within the cup to the outside thereof at points close to the hooks.

RAYMOND F. MINER.

REFERENCES CITED

The following references are of record in the file of this patent:

UNITED STATES PATENTS

| Number | Name | Date |
|---|---|---|
| 1,154,168 | Bosserman | Sept. 21, 1915 |
| 2,492,557 | Deimler | Dec. 27, 1949 |